Sept. 23, 1947.  W. A. GANTNER  2,427,956
BRAKE RIGGING
Filed May 18, 1945
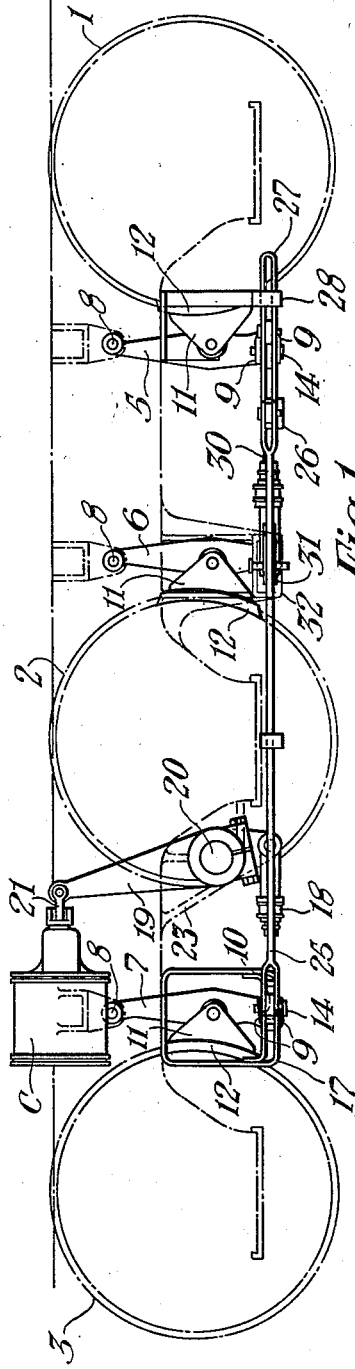
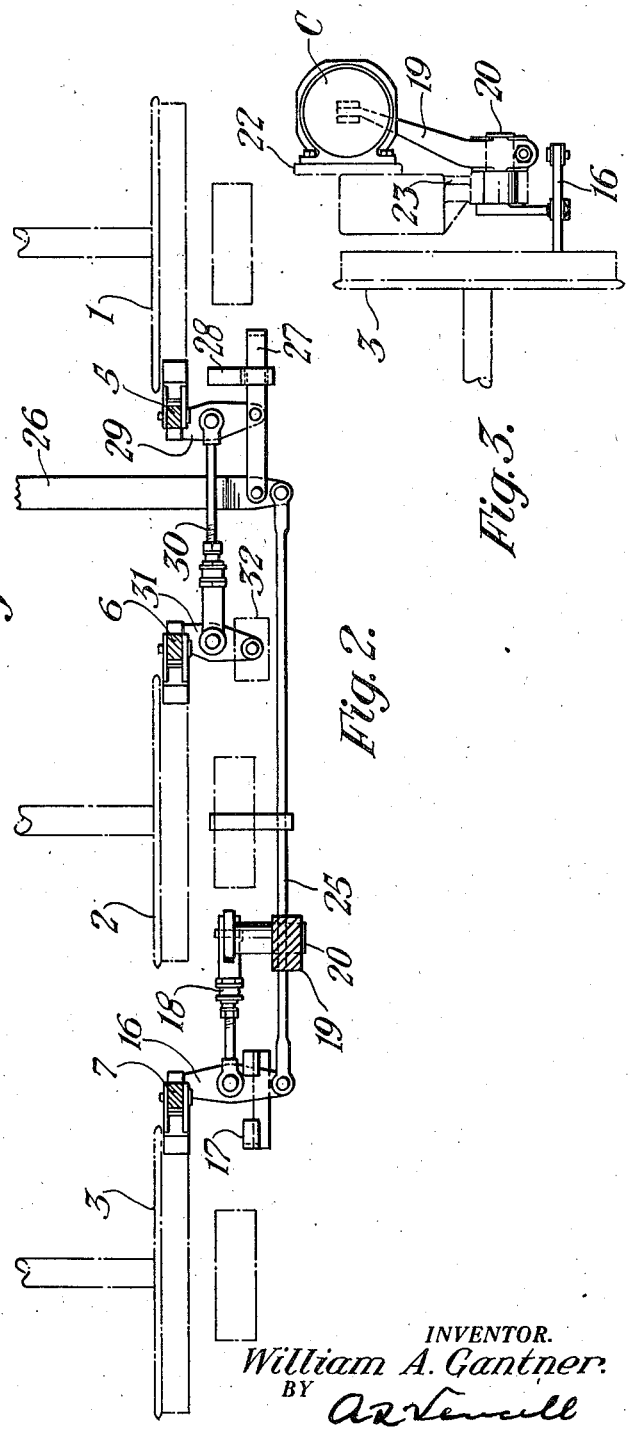
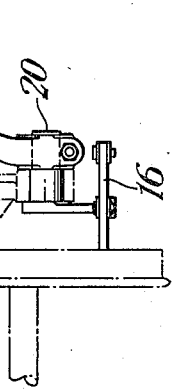
INVENTOR.
William A. Gantner.
BY
HIS ATTORNEY Patented Sept. 23, 1947

2,427,956

UNITED STATES PATENT OFFICE 2,427,956

BRAKE RIGGING

William A. Gantner, Wilkinsburg, Pa., assignor to
The American Brake Company, Swissvale, Pa.,
a corporation of Missouri Application May 18, 1945, Serial No. 594,542

6 Claims. (Cl. 188—46)

My invention relates to brake rigging for railway rolling stock, and particularly to brake rigging for use on a six-wheel motor truck for a Diesel electric locomotive.

One object of my invention is to provide a brake rigging of the type described which can be conveniently mounted on the motor truck within the limited space available.

According to my invention, I provide each wheel with a single brake shoe, and I employ two brake cylinders one for actuating the shoes associated with the three wheels on one side of the truck, and the other for actuating the shoes associated with the wheels on the other side of the truck. The piston rod of each brake cylinder is pivotally connected at one end to the upper end of a brake cylinder lever which is secured at its lower end to a crank pivotally mounted on the truck frame, and each crank is connected through a push connector with a first floating equalizer lever intermediate its ends. The said first floating equalizer lever is slidably supported adjacent its outer end and is operatively connected at its inner end with a brake shoe for the associated wheel. The outer end of said first floating equalizer lever is operatively connected by means of a pull rod with one end of an intermediate beam which extends transversely of the truck between the front and middle pair of wheels, and said intermediate beam, in turn, is operatively connected by means of a strap link with the outer end of a second floating equalizer lever the inner end of which is operatively connected with a brake shoe associated with the one front wheel of the truck. Said second floating equalizer lever is operatively connected intermediate its ends by means of a push connector with a third lever associated with the one middle wheel of the truck. Said third lever is pivotally attached at its outer end to the truck frame and is operatively connected at its inner end with a brake shoe for said one middle wheel of the truck.

Other objects and characteristic features of my invention will become apparent as the description proceeds.

I shall describe one form of brake rigging embodying my invention, and shall then point out the novel features thereof in claims.

In the accompanying drawings, Fig. 1 is a side elevational view of a Diesel electric locomotive truck provided with one form of brake rigging embodying my invention. Figs. 2 and 3 are top plan, and left-hand end views, respectively, of that portion of the brake rigging embodying my invention which is applied to one-half of the truck, it being understood that the portion which is applied to the other half of the truck is identical with the portion shown.

Similar reference characters refer to similar parts in all three views.

Referring to the drawings, the reference characters 1, 2 and 3 designate respectively the front, middle and rear wheels at one side of a six-wheel motor truck for a Diesel electric locomotive. Only one-half of the truck is shown because the other half is identical to the half which is shown, and it should be pointed out at the outset that in the description which follows the half of the truck which is not shown is provided with symmetrical brake rigging which is a duplicate of that which I shall now describe.

The brake rigging as shown comprises a hanger lever 5 disposed at the rear side of the front wheel 1, a hanger lever 6 disposed at the forward side of the middle wheel 2, and a hanger lever 7 disposed at the forward side of the rear wheel 3. The hanger levers are pivotally attached at their upper ends to the truck frame by means of pivot pins 8, and each hanger lever is provided at its lower end with spaced jaws 9 which form a recess 10. A brake head 11 is pivotally attached to each hanger lever intermediate its ends, and each brake head carries a brake shoe 12 for engagement with the tread of the associated wheel.

A transversely extending horizontally disposed floating equalizer lever 16 is slidably supported adjacent its outer end by means of a suitable supporting bracket 17 secured to the truck frame, and is secured at its inner end within the recess 10 in the hanger lever 7 by means of a pivot pin 14 which extends through registered openings formed in the equalizer lever and in the jaws 9 of the hanger lever. The equalizer lever 16 is operatively connected intermediate its ends by means of an adjustable push connector 18 with the depending arm of a crank 20 which, as best seen in Fig. 3, is pivotally supported in a bearing 23 provided on the side of the truck frame. A vertically disposed brake cylinder lever 19 is secured to the crank 20 on the opposite side of the bearing 23 from the depending arm, and is operatively connected at its upper end with the push rod 21 of a brake cylinder C. The brake cylinder C is conveniently mounted on a vertically disposed supporting member 22 provided on the side of the truck frame in front of the rear wheel 3. The brake cylinder is of the usual type and includes the usual cylinder portion (not shown), return spring (not shown) and push rod 21 operated by the piston.

The outer end of the floating equalizer lever 16 is operatively connected by means of a pull rod 25 with the outer end of an intermediate beam 26 which extends transversely of the truck between the front wheels 1 and middle wheels 2 of the truck. The intermediate beam 26, in turn, is operatively connected adjacent its outer end with one end of a strap link 27 the other end of which is slidably supported by means of a supporting bracket 28 secured to the truck frame. Intermediate its ends the strap link 27 is pivotally connected to the outer end of a second transversely extending horizontally disposed floating equalizer lever 29 the inner end of which is operatively connected with the lower end of the hanger lever 5 in the same manner that the inner end of the floating equalizer lever 16 is operatively connected with the lower end of the hanger lever 7. The floating equalizer lever 29 is operatively connected intermediate its ends by means of an adjustable push connector 30 with a dead lever 31 intermediate its ends. The dead lever 31 is pivotally supported at its outer end in a supporting bracket 32 suspended from the truck frame, and is operatively connected at its inner end with the lower end of the hanger lever 6.

In operation when fluid pressure is supplied to the brake cylinder C the push rod 21 is forced outwardly in the cylinder, and this outward movement of the push rod acts through the brake cylinder lever 19, crank 20, and push connection 18 to move the floating equalizer lever 16 toward the left as viewed in Fig. 2. This movement of the equalizer lever 16 will first cause this lever to pivot about its point of connection with the pull rod 25 and move the hanger lever 7 toward the wheel 3 until the brake shoe 12 moves into frictional contact with the wheel, whereupon the continued movement of the equalizer lever by the push connection will then cause this lever to fulcrum about its inner end and thus move the pull rod 25, intermediate beam 26, and strap link 27 toward the left. As the strap link 27 moves toward the left, the equalizer lever 29 will first pivot about its point of connection with the push connector 30 to thereby move the brake shoe 12 carried by the hanger lever 5 into frictional engagement with the wheel 1, whereupon the equalizer lever 29 will then swing about its point of connection with the hanger lever 5 and thus move the push connector 30 toward the left. This latter movement, in turn, will cause the lever 31 to swing in a counterclockwise direction, as viewed in Fig. 2, and thus move the brake shoe 12 carried by the hanger lever 6 into frictional engagement with the middle wheel 2. The parts are so proportioned that when all of the brake shoes have moved into frictional engagement with the associated wheel, the braking forces exerted by the shoes on the associated wheels will be substantially equal.

To release the brakes the fluid which was supplied to the brake cylinder C to apply the brakes is vented from the brake cylinder in the usual manner, whereupon the force due to the release spring disposed within the brake cylinder together with the force of gravity acting on the hanger levers will act to move the hanger levers, and hence the brake shoes to their released positions.

It should be particularly noted that with the brake rigging constructed in the manner described all parts of the brake rigging with the exception of the hanger levers and the intermediate beam 26 are disposed outboard of the wheels where they will not interfere with any part of the driving mechanism for the wheels. This driving mechanism is not shown, but it will be understood that this driving mechanism comprises an integral part of the motor truck.

Although I have herein shown and described only one form of brake rigging embodying my invention, it is understood that various changes and modifications may be made therein within the scope of the appended claims without departing from the spirit and scope of my invention.

Having thus described my invention, what I claim is:

1. A brake rigging for a six-wheel truck comprising at each side of the truck a brake cylinder secured to the truck frame, a brake cylinder lever pivotally attached to the truck frame and operatively connected at its upper end with said brake cylinder, a transversely extending floating equalizer lever operatively connected intermediate its ends by means including a push connector with the lower end of said brake cylinder lever, means for applying a brake to the one rear wheel of the truck connected with the inner end of said equalizer lever, a pull rod connected at one end to the outer end of said equalizer lever, an intermediate beam extending transversely of the truck between the front and middle wheel of the truck and connected at one end directly to the other end of said pull rod, and means for applying brakes to said front and middle wheel of the truck operatively connected with said intermediate beam.

2. A brake rigging for a six-wheel truck comprising at each side of the truck a brake cylinder secured to the truck frame, a brake cylinder lever secured at its lower end to a crank pivotally attached to the truck frame and operatively connected at its upper end with said brake cylinder, a transversely extending floating equalizer lever connected intermediate its ends by means of a push connector with said crank, means for slidably supporting said equalizer lever adjacent its outer end, means for applying a brake to the one rear wheel of the truck connected with the inner end of said equalizer lever, a pull rod connected at one end to the outer end of said equalizer lever, an intermediate beam extending transversely of the truck between the front and middle wheel of the truck and connected at one end directly to the other end of said pull rod, and means for applying brakes to said front and middle wheel of the truck operatively connected with said intermediate beam.

3. A brake rigging for a six-wheel truck comprising at each side of the truck a brake cylinder secured to the truck frame, a brake cylinder lever secured at its lower end to a crank pivotally attached to the truck frame and operatively connected at its upper end with said brake cylinder, a first transversely extending floating equalizer lever operatively connected intermediate its ends by means of a push connector with said crank, means for applying a brake to the one rear wheel of the truck connected with the inner end of said equalizer lever, a pull rod connected at one end to the outer end of said equalizer lever, an intermediate beam extending transversely of the truck between the front and middle wheel of the truck and connected at one end to the other end of said pull rod, a strap link slidably supported at one end and operatively connected at the other end with said intermediate beam, a second transversely extending floating equalizer lever operatively connected at its outer end with said strap link and operatively connected at its inner end with brake applying means for the one front wheel of the truck, a second push connector connected at one end with said second equalizer lever intermediate its ends, and brake applying means for the middle wheel of the truck connected with the other end of said second push connector.

4. A brake rigging for a six-wheel truck comprising at each side of the truck a brake cylinder secured to the truck frame, a brake cylinder lever secured at its lower end to a crank pivotally attached to the truck frame and operatively connected at its upper end with said brake cylinder, a first transversely extending floating equalizer lever connected intermediate its ends by means of a push connector with said crank, means for applying a brake to the one rear wheel of the truck connected with the inner end of said equalizer lever, a pull rod connected at one end to the outer end of said equalizer lever, an intermediate beam extending transversely of the truck between the front and middle wheel of the truck and connected at one end to the other end of said pull rod, a strap link slidably supported at one end and operatively connected at the other end with said intermediate beam, a second transversely extending floating equalizer lever operatively connected at its outer end with said strap link and operatively connected at its inner end with brake applying means for the one front wheel of the truck, a second push connector connected at one end with said second equalizer lever intermediate its ends, a third transversely extending lever pivotally attached at its outer end to the truck frame and operatively connected intermediate its ends with the other end of said second push connector and at its inner end with brake applying means for the middle wheel of the truck.

5. Brake rigging for a six-wheel truck comprising a first horizontally disposed transversely extending equalizer lever located at the rear side of one front wheel of the truck, a second horizontally disposed equalizer lever disposed at the forward side of the rear wheel of the truck on the same side of the truck as said first equalizer lever, a third horizontally disposed lever located at the forward side of the middle wheel of the truck on the same side of the truck as said equalizer lever, a brake element for each wheel connected with the inner end of the associated lever, a push connector connecting said first and third levers intermediate their ends, an intermediate brake beam extending transversely of the truck between said first and third levers, means connecting the outer end of said beam with the outer end of said second equalizer lever, means connecting said brake beam with the outer end of said first equalizer lever, and power means connected with said second equalizer lever intermediate its ends.

6. Brake rigging for a six-wheel locomotive truck comprising a horizontally extending lever associated with each wheel on one side of the truck and operatively connected at its inner end with a brake element for the associated wheel, power means connected with the lever for the rear wheel of the truck intermediate its ends, means including a pull rod, an intermediate beam and a strap link for operatively connecting the outer end of the lever for said third wheel with the outer end of the lever for the first wheel, and a push connection connecting the levers for the first and second wheels intermediate their ends.

WILLIAM A. GANTNER.

REFERENCES CITED

The following references are of record in the file of this patent:

UNITED STATES PATENTS

| Number | Name | Date |
| --- | --- | --- |
| 1,913,625 | Crossman | June 13, 1933 |
| 2,093,793 | Aurien | Sept. 21, 1937 |